United States Patent [19]
Beasley et al.

[11] Patent Number: 5,937,176
[45] Date of Patent: *Aug. 10, 1999

[54] INTERCONNECTION SYSTEM HAVING CIRCUITS TO PACKETIZE KEYBOARD/MOUSE ELECTRONIC SIGNALS FROM PLURAL WORKSTATIONS AND SUPPLY TO KEYBOARD/MOUSE INPUT OF REMOTE COMPUTER SYSTEMS THROUGH A CROSSPOINT SWITCH

[75] Inventors: Danny L. Beasley, Mukilteo; Robert V. Seifert, Jr., Redmond; Paul Lacrampe, Seattle; James C. Huffington, Edmond; Thomas Greene, Bellevue; Kevin J. Hafer, Woodinville, all of Wash.

[73] Assignee: Apex PC Solutions, Inc., Woodinville, Wash.

[*] Notice: This patent is subject to a terminal disclaimer.

[21] Appl. No.: 08/970,168

[22] Filed: Nov. 12, 1997

Related U.S. Application Data

[63] Continuation of application No. 08/519,193, Aug. 25, 1995, Pat. No. 5,721,842.

[51] Int. Cl.$^6$ ............................. G06F 13/00; G06F 13/14; G06F 3/153
[52] U.S. Cl. .......................... 395/311; 395/858; 345/113; 345/329; 348/552; 348/525
[58] Field of Search ................................... 395/311, 312, 395/200.38, 200.39, 858, 856, 811, 822; 345/435, 113, 326, 329; 370/351, 360; 348/194, 525, 552

[56] References Cited

U.S. PATENT DOCUMENTS

| | | | |
|---|---|---|---|
| 3,634,830 | 1/1972 | Baskin | 395/311 |
| 3,774,158 | 11/1973 | Clark | 340/825.02 |
| 3,955,188 | 5/1976 | Viswanathan | 345/29 |
| 4,078,249 | 3/1978 | Lelke et al. | 395/116 |

(List continued on next page.)

FOREIGN PATENT DOCUMENTS

| | | |
|---|---|---|
| 0 174 099 A2 | 3/1986 | European Pat. Off. . |
| WO 87/00317 | 1/1987 | WIPO . |
| WO 94/19749 | 9/1994 | WIPO . |
| WO 95/01055 | 1/1995 | WIPO . |

OTHER PUBLICATIONS

Nguyen, Huy "Key–view unlocks server problems", PC Week Mar. 27, 1995 v12 n12 pN20.
Rigney, Steve "J&L's server room in a box", PC Magazine May 30, 1995 v14 n10 pNE19.
PCT International Search Report for PCT/US96/13772, International filing date Aug. 22, 1996.
Switchback™ User Guide Pamphlet©, Mar. 1995.
APEX Desktop Concentrator Product Brochure, APEX PC Solutions, Redmond, Washington, dated believed to be prior to Aug. 151, 1994.

(List continued on next page.)

*Primary Examiner*—Dung C. Dinh
*Attorney, Agent, or Firm*—Christensen O'Connor Johnson & Kindness PLLC

[57] ABSTRACT

A computerized switching system for coupling a workstation to a remotely located computer. A signal conditioning unit receives keyboard and mouse signals generated by a workstation and generates a data packet which is transmitted to a central crosspoint switch. The packet is routed through a crosspoint switch to another signal conditioning unit located at a remotely located computer. The second signal conditioning unit applies the keyboard and mouse commands to the keyboard and mouse connectors of the computer as if the keyboard and mouse were directly coupled to the remote computer. Video signals produced by the remote computer are transmitted through the crosspoint switch to the workstation. Horizontal and vertical sync signals are encoded on to the video signals to reduce the number of cables that extend between the workstation and the remote computer. The signal conditioning units connected to the workstations include an onscreen programming circuit that produces menus for the user on a video display of the workstation.

6 Claims, 13 Drawing Sheets

U.S. PATENT DOCUMENTS

| | | | |
|---|---|---|---|
| 4,150,429 | 4/1979 | Ying | 395/311 |
| 4,313,176 | 1/1982 | Cecil | 379/93.05 |
| 4,630,284 | 12/1986 | Cooperman | 375/251 |
| 4,641,262 | 2/1987 | Bryan et al. | 345/168 |
| 4,665,501 | 5/1987 | Saldin et al. | 395/828 |
| 4,710,917 | 12/1987 | Tompkins et al. | 395/200.34 |
| 4,800,429 | 1/1989 | Perkins | 348/500 |
| 4,807,184 | 2/1989 | Shelor | 395/311 |
| 4,823,256 | 4/1989 | Bishop et al. | 395/182.08 |
| 4,879,716 | 11/1989 | McNally et al. | 395/311 |
| 4,941,087 | 7/1990 | Kap | 395/733 |
| 4,949,169 | 8/1990 | Lumelsky et al. | 348/8 |
| 5,029,111 | 7/1991 | Mansell | 345/510 |
| 5,043,866 | 8/1991 | Myre, Jr. et al. | 707/202 |
| 5,117,225 | 5/1992 | Wang | 345/2 |
| 5,121,486 | 6/1992 | Kurihara et al. | 395/311 |
| 5,166,674 | 11/1992 | Baum et al. | 340/825.07 |
| 5,222,212 | 6/1993 | Johary et al. | 345/520 |
| 5,230,066 | 7/1993 | Morimi | 345/501 |
| 5,268,676 | 12/1993 | Asprey et al. | 345/2 |
| 5,357,420 | 10/1994 | Gohi | 304/131 |
| 5,396,593 | 3/1995 | Mori et al. | 345/501 |
| 5,448,697 | 9/1995 | Parks et al. | 345/520 |
| 5,486,868 | 1/1996 | Shyu et al. | 348/525 |
| 5,486,869 | 1/1996 | Cooper | 348/524 |
| 5,499,377 | 3/1996 | Lee | 395/200.74 |
| 5,502,499 | 3/1996 | Birch et al. | 348/523 |
| 5,519,874 | 5/1996 | Yamagishi et al. | 395/200.31 |
| 5,526,024 | 6/1996 | Gaglianello et al. | 345/507 |
| 5,581,303 | 12/1996 | Djabbari et al. | 348/524 |
| 5,604,509 | 2/1997 | Moore et al. | 345/2 |
| 5,617,547 | 4/1997 | Feeney et al. | 395/311 |

OTHER PUBLICATIONS

APEX PC Solutions *Users Guide*, Manual P/N 053–0006–01, 8001/KVM, Redmond, Washington, Apr. 1993.

APEX PC Solutions Product Brochure, APEX PC Solutions, Redmond, Washington.

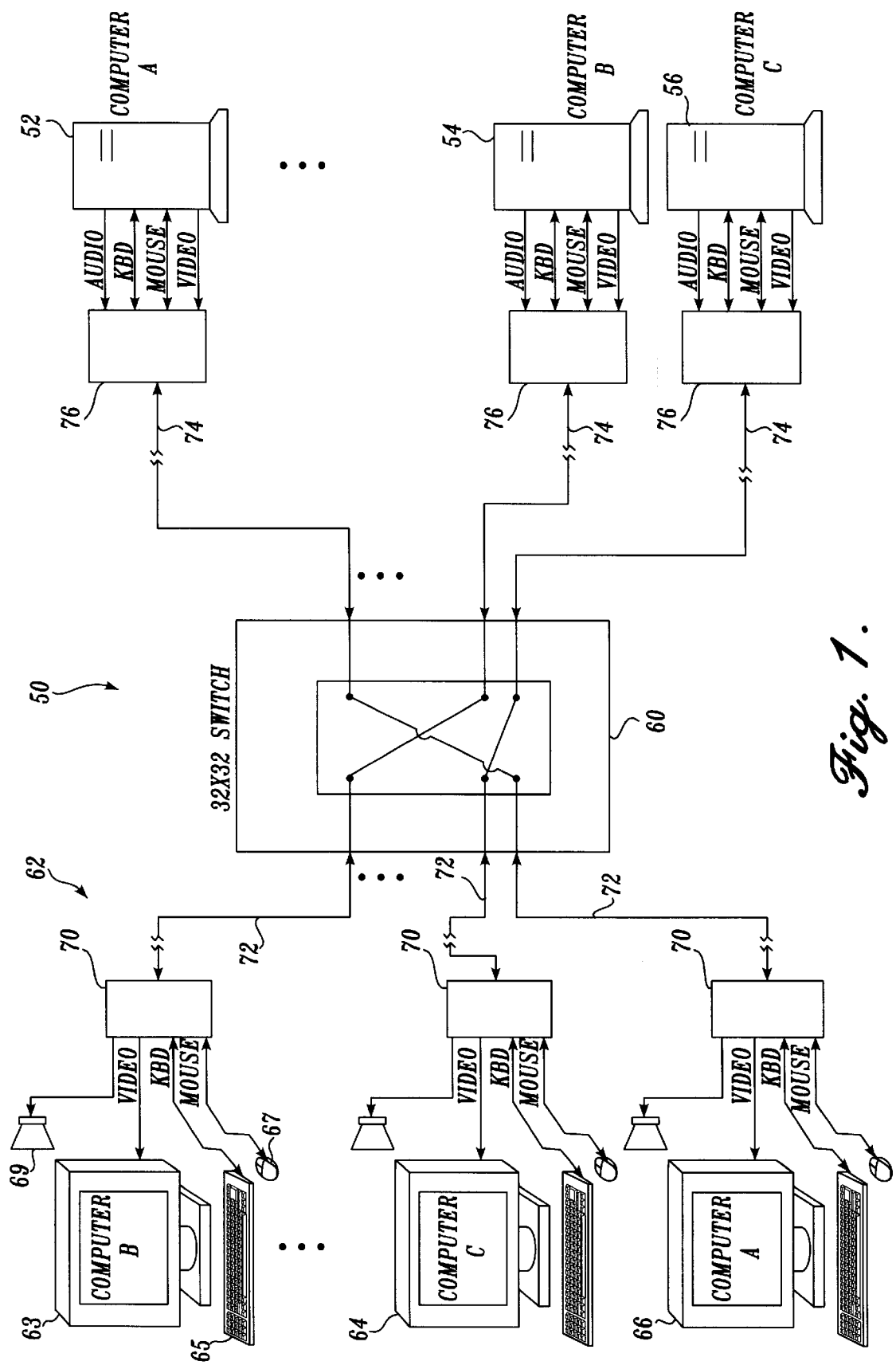

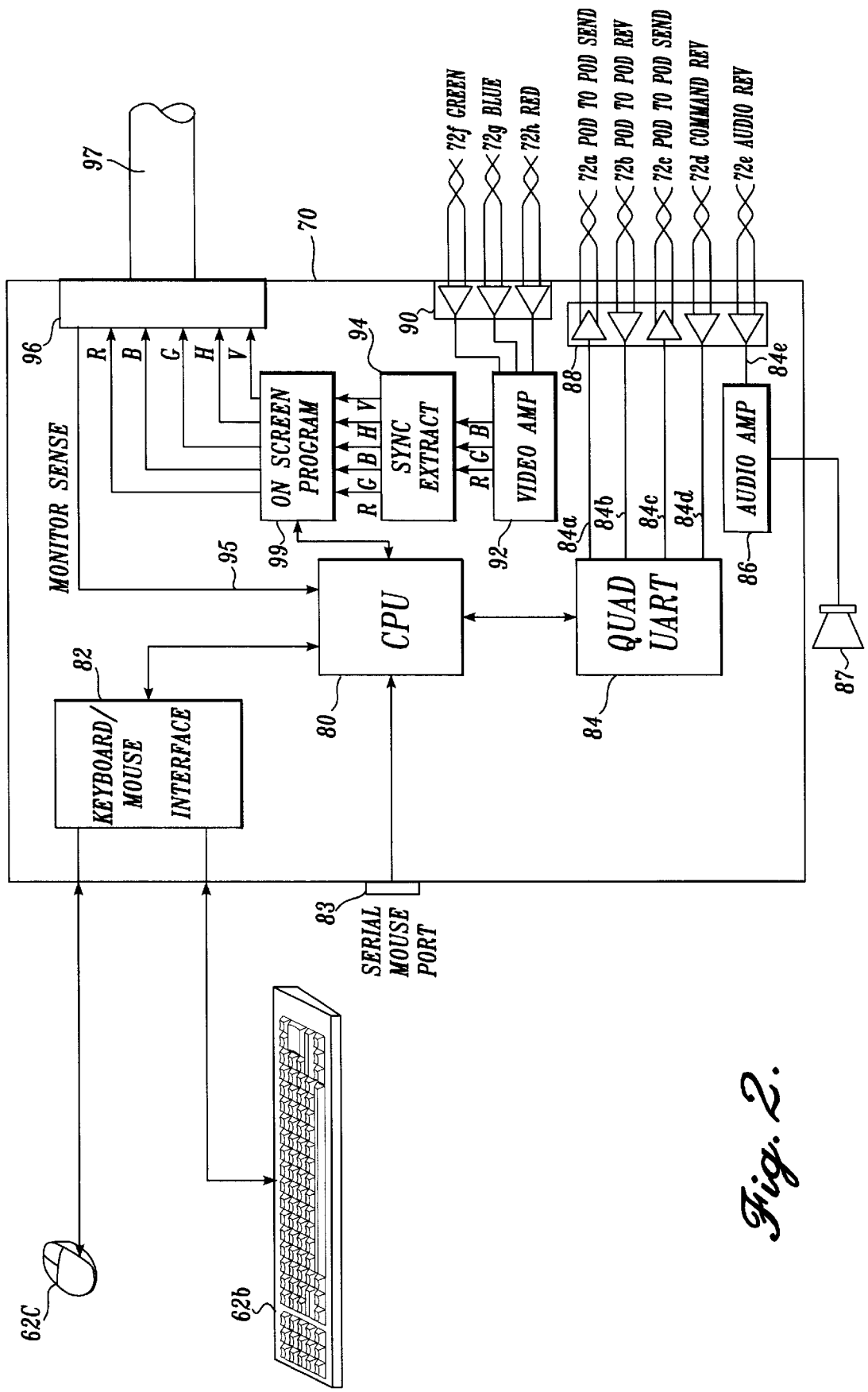

THE VIDEO BUS USES 8 8X4 SWITCHES PER COLOR.
TOTAL VIDEO SWITCHES EQUALS 24.

INTERCONNECTION SYSTEM HAVING CIRCUITS TO PACKETIZE KEYBOARD/MOUSE ELECTRONIC SIGNALS FROM PLURAL WORKSTATIONS AND SUPPLY TO KEYBOARD/MOUSE INPUT OF REMOTE COMPUTER SYSTEMS THROUGH A CROSSPOINT SWITCH

This application is a continuation of application Ser. No. 08/519,193, filed Aug. 25, 1995 now Pat. No. 5,721,842.

FIELD OF THE INVENTION

The present invention relates to systems for interconnecting remotely located computers.

BACKGROUND OF THE INVENTION

In a typical local computer network there are a number of client computers that are coupled via a communication link to a number of network server resources. These resources include file servers, print servers, modem servers, and CD-ROM servers for example. Each server is usually a stand alone computer with its own keyboard, mouse and video monitor. Each client computer can utilize the functions provided by the server computers through the communication link.

Most computer networks have one or more system administrators, i.e. human operators, for the server computers. The system administrators monitor the operation of the software running on the server computers, load new software packages, delete outdated files and perform other tasks necessary to maintain the operation of the network. While most administrator tasks (modifying software, deleting files, etc.) can be performed over the network from a client computer, there are some situations where the network administrators must be physically located at the server computers for direct access to and operation of them. For example, it is not possible to reboot a server computer over the network. If the server computers are not close together, the time required for a task as simple as rebooting can be substantial.

Although it is possible to run dedicated communication links to each server computer in order to allow a system administrator to operate the network from a central location, a large number of cables are required for anything other than a very simple network.

SUMMARY OF THE INVENTION

The present invention provides a computerized switching system that allows centrally located network administrators to operate multiple server computers over long distances without requiring a complicated wiring scheme. In general, the switching system allows data transmission between a workstation and a remotely located server computer. A signal conditioning unit receives keyboard and mouse signals from a workstation and generates a serial data packet which is transmitted to a central crosspoint switch. The crosspoint switch routes the keyboard/mouse packet to another signal conditioning unit that is coupled to the remotely located server computer. The signal conditioning unit coupled to the server computer decodes the keyboard/mouse packet and applies the signals to a keyboard and mouse connector on the remote computer in the same manner as if the mouse and keyboard were directly coupled to the remote computer.

Video signals produced by the remote computer are transmitted through the crosspoint switch to the workstation. In order to minimize the number of wires extending between the remote computer and the workstation, the horizontal and vertical sync signals as well as a mode signal are encoded with the analog video signals. The present embodiment of the invention allows any of thirty-two workstations to be connected to any of thirty-two remotely located server computers.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 1 is a pictorial diagram of a computerized switching system, according to the present invention, a number of workstations and a number of remotely-located computers;

FIG. 2 is a block diagram of a signal conditioning unit (pod) that is coupled to a workstation;

DETAILED DESCRIPTION OF THE PREFERRED EMBODIMENT

Figure 2A:
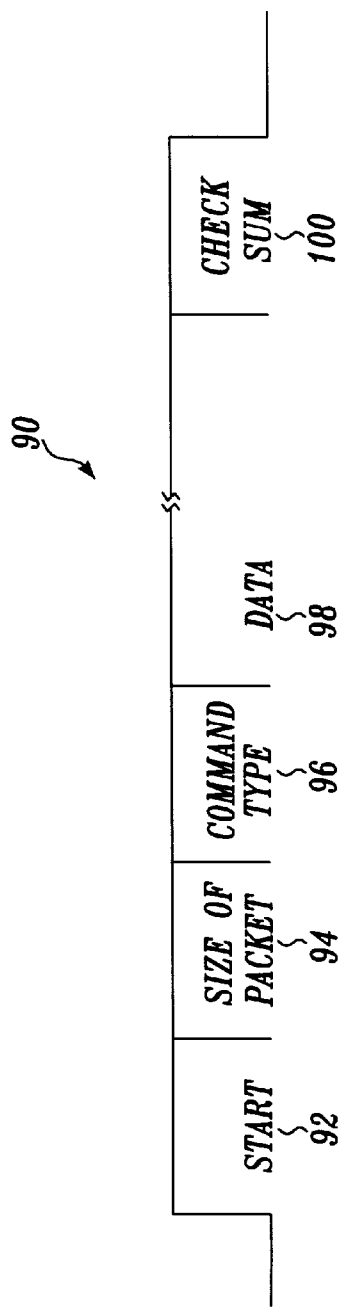
FIG. 2A is a timing diagram of a serial pod to pod packet that is transmitted by the signal conditioning unit shown in FIG. 2.

The present invention is a computerized switching system for allowing a number of computer workstations to be coupled to a number of remotely-located server computers. In the presently preferred embodiment of the invention, up to thirty-two workstations can be connected to any of thirty-two remote computer systems. However, those skilled in the art will recognize that the number of possible interconnections can easily be modified for the environment in which the invention is to be used.

Referring now to FIG. 1, the computerized switching system or crosspoint switch according to the present invention allows a number of server computers 52, 54, 56 to be coupled to a number of workstations 62, 64, 66. Each workstation includes a video monitor 63, a keyboard 65 and a cursor control device such as a mouse 67. In accordance with the present invention, signals from the keyboard 65 and the mouse 67 are received by a signal conditioning circuit or pod 70. The pod transmits the keyboard and mouse signals over a communication link 72 to a central crosspoint switch 60. After being routed through the crosspoint switch 60, the keyboard and mouse signals are retransmitted on another communication link 74 to a pod 76, which is coupled to the remotely-located server computer. The pod 76 supplies the keyboard and mouse signals through appropriate connectors to keyboard and mouse input ports of the remote computer, just as if the keyboard 65 and mouse 67 were directly coupled to the keyboard and mouse input ports.

Audio and video signals produced by the remote server computer 52, 54 or 56 are received by the associated pod 76 and transmitted in the reverse direction along the communication link 74 to the central crosspoint switch 60. The central crosspoint switch routes the audio and video signals to one of the communication links 72 for transmission to a pod 70. The pod 70 then supplies the audio and video signals to the associated video monitor 63 and a speaker 69 of the workstation. From a user's perspective, the work station appears as if it is directly coupled to the remote server computer.

FIG. 2 is a block diagram of a pod 70. As described above, the pod operates to receive the mouse and keyboard signals and to transmit them through the crosspoint switch to a remotely-located server computer system. In addition, the pod receives video and audio signals from the remote server computer by way of the central crosspoint switch and supplies them to the video monitor and speaker of the workstation.

The pod 70 generally comprises a central processing unit (CPU) 80 having its own random access and read only memories. A keyboard/mouse interface 82 is coupled to the CPU 80 to receive and condition the electronic signals from the keyboard 65 and mouse 67. As the user moves the mouse or types on the keyboard, the keyboard/mouse interface 82 generates an interrupt signal that is fed to the CPU 80. The CPU 80 then reads the digitally buffered keyboard and mouse signals from the keyboardmouse interface 82 and converts the signals into a data packet that is transmitted to the remote computer.

As shown in FIG. 2A, the pod to pod data packet 90 begins with a unique character 92 that marks the beginning of the data packet followed by a byte 94 that indicates the length of the packet. The next byte 96 identifies the type of data (mouse, keyboard, monitor type etc.) that the packet represents. The next series of bytes 98 represents the keyboard/mouse data to be transmitted to the server computer. Finally, a checksum byte 100 allows for the correction of errors that may occur during transmission.

It should be noted that the pod to pod packets are not limited to carrying keyboard and mouse data The packets allow the pod at the work station to "talk to" the pod at the remote computers. Each pod acknowledges to the other that a packet was received correctly and in case of an error requests that a packet be retransmitted.

After the CPU 80 has assembled the pod to pod packet, the packet is transmitted to a quad UART 84, which transmits and receives serial data on four leads 84a–84d. The pod to pod packet is serialized and transmitted on the lead 84a to a differential line driver/receiver 88 that transmits and receives data on a number of twisted-pair cables 72a–72e, that are coupled to the central crosspoint switch 60 (shown in FIG. 1). In the presently preferred embodiment of the invention, the differential line drivers/receivers are model Nos. DS8921, manufactured by National Semiconductor. The drivers transmit a positive version of the data on one wire of the twisted-pair cable and the inverse of the data on the other wire of the twisted pair.

This allows the data to be transmitted along cables up to 500 feet in length without the use of additional amplifiers.

As the user is operating the remote server computer, the remote computer may transmit commands which affect the operation of the mouse and keyboard. These include the mouse sensitivity, the keyboard repeat rate, activating one or more LEDs on the keyboard (such as the number lock, capital letter lock, etc.). The keyboardmouse commands contained in a pod to pod packet transmitted from the remote computer are received on twisted-pair cable 72b by the differential line driver/receiver 88. The UART 84 converts the received serial keyboard/mouse commands into a parallel format and supplies the data to the CPU 80. The CPU 80 then generates the appropriate signals which are fed to the keyboard/mouse interface 82 and applied to the keyboard 62b and mouse 62c.

Video signals transmitted from the remote server computer are received on three sets of twisted-pair cables 72f, 72g, and 72h by a set of differential line receivers 90. The output signals produced by the differential line receivers 90 are supplied to a video amplifier 92. The output of the video amplifier is coupled to a sync extract circuit 94 which removes an embedded horizontal and vertical sync signal as well as a mode signal from the green, blue and red video signals respectively. The sync extract circuit 94 supplies the red, blue, and green analog video signals as well as the horizontal and vertical sync signals on separate leads to an onscreen programming circuit 99 that is described in further detail below. The onscreen programming circuit 99 feeds the video signals to a connector 96, which is coupled to the video monitor of the workstation by a conventional video cable 97. As will be described in further detail below, the horizontal and vertical sync signals are embedded into the green and blue color video signals in order to minimize the number of wires that extend between the workstation and the remote server computer as well as to reduce the complexity of the crosspoint switch.

The CPU 80 also reads a set of four monitor sense leads 95 to determine what type of monitor is connected to it. Monitor sense data is generated and transmitted in a pod to pod packet as shown in FIG. 2A The remote computer receives the monitor data and supplies it to the remote computer in order to adjust its video signals accordingly.

In addition to transmitting and receiving keyboard and mouse signals from the remote computer, the pod 70 can communicate with the central crosspoint switch. Data to be transmitted to the central crosspoint switch are sent on a twisted pair cable 72c while data transmitted from the central crosspoint switch are received on a twisted pair cable 72d.

Commands sent between the pod 70 and the central crosspoint switch allow a user to connect the work station to another remote computer, allow the central crosspoint switch to interrogate the status of the pod, update the firmware of the pod, etc. using the packet structure shown in FIG. 2B as will be described below. When the user wishes to send a command to the central crosspoint switch, a special sequence of keystrokes is used. In the present embodiment of the invention, all commands are preceded by the "printscreen" key and end with the "enter" key. The CPU 80 parses the keyboard strokes for these keys and analyzes the keystrokes to determine the destination of the command. If the command is directed to the pod itself no data packet is produced. If the command is directed to the remote computer, a pod to pod packet is generated and transmitted. If the command is directed to the central crosspoint switch, the CPU assembles a command packet that is transmitted to the central crosspoint switch on the twisted pair cable 72*c*.

Figure 3:
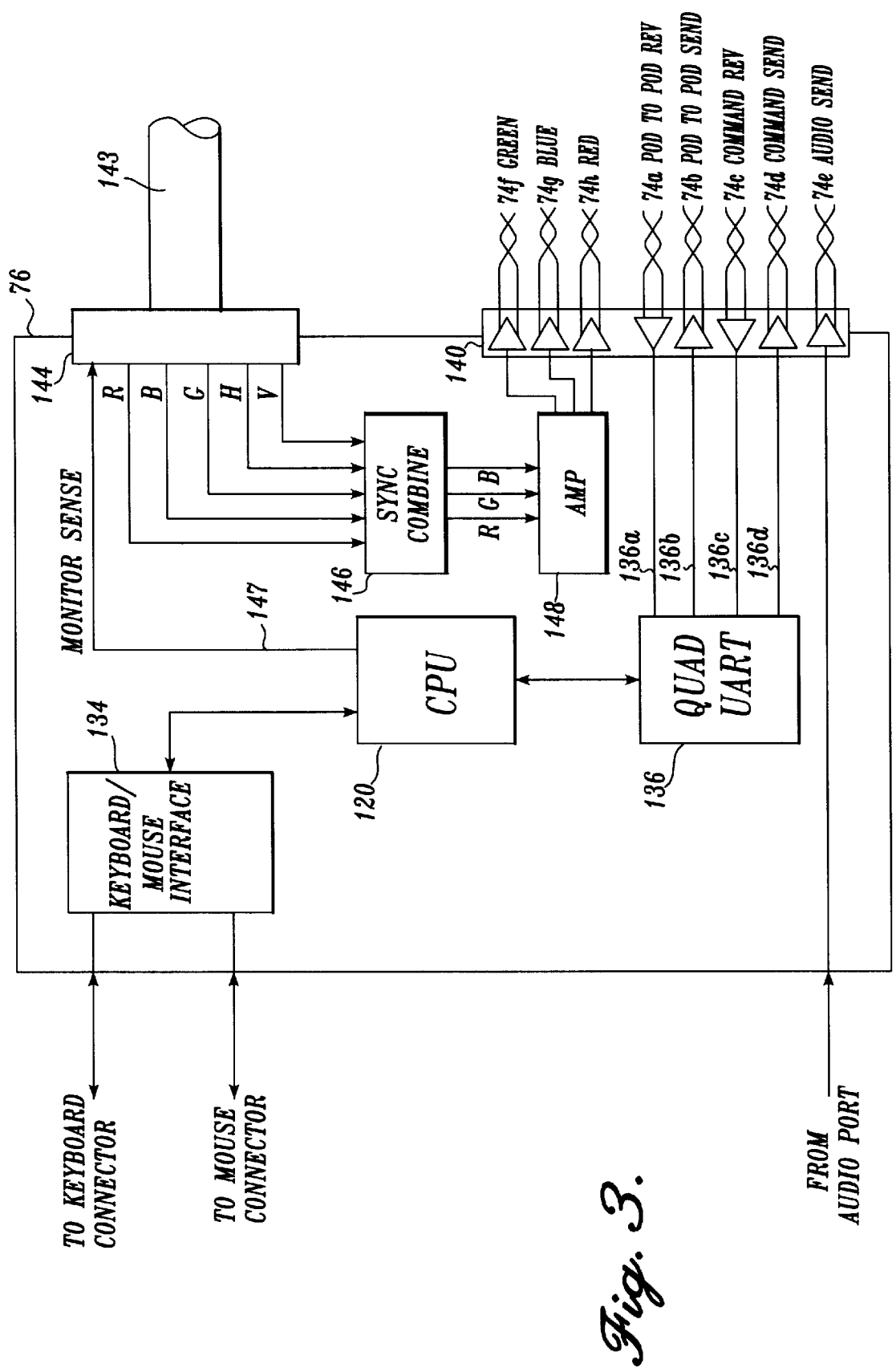
FIG. 3 is a block diagram of a signal conditioning unit (pod) that is coupled to a remote computer system.

A block diagram of a pod 76 that is coupled to the remote server computers is shown in FIG. 3. The pod 76 includes a central processing unit (CPU) 120 that is coupled to a keyboard/mouse interface 134. The keyboard/mouse interface 134 supplies signals to and receives signals from the server computer's keyboard and mouse connectors. The keyboard and mouse signals from the computer's keyboard and mouse connectors are read by the CPU 120 and assembled into a pod to pod packet in the same manner as the pod to pod packet described above and shown in FIG. 2A. The pod to pod packet produced by the CPU 120 is delivered to a QUAD UART 136 that transmits the packet serially over a lead 136*b* to a differential line driver 140. The differential line driver drives a twisted-pair cable 74*a* that is coupled to the central crosspoint switch.

A pod to pod packet that is transmitted from a workstation is received on a twisted-pair cable 74*b* and supplied to differential line receiver 140. The output signal of the differential line receiver is supplied to the QUAD UART 136 which converts the packet from a serial format to a parallel format. The CPU reads the packet and then transmits the received keyboard and mouse signals to the keyboard and mouse interface 134 where the signals are supplied to the remote computer's keyboard and mouse connectors in the same manner as if the keyboard and mouse were directly connected to the remote server computer. The particular format of the signals applied to the keyboard and mouse connectors may vary with the type of the remote computer. The CPU within the pod 76 is therefore programmed to translate the signals into their proper format.

Figure 2B:
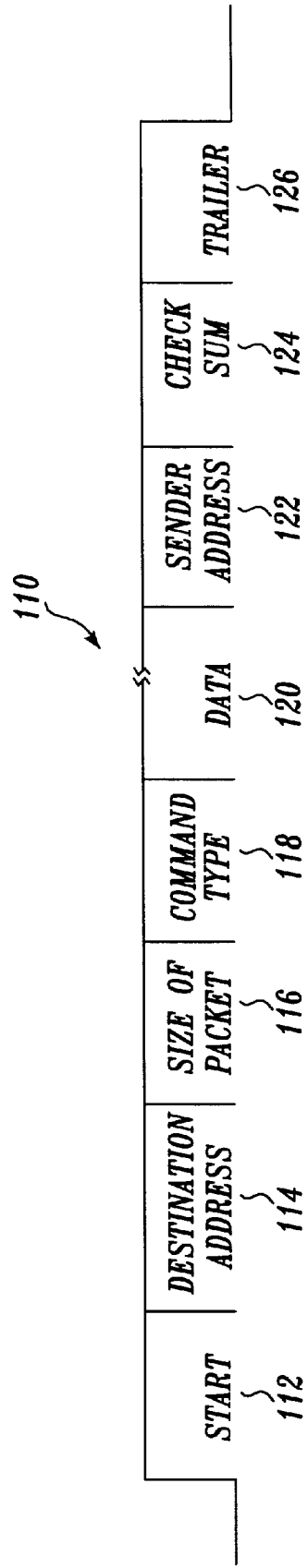
FIG. 2B is a timing diagram of a data packet that is routed within the central crosspoint switch.

Commands sent from the pod 76 to the central crosspoint switch allow the remote computer to interrogate the status of the pod, update the firmware of the pod etc. using the packet structure of FIG. 2B. As with the user pod, all commands are preceded with the "printscreen" key and end with the "enter" key. The CPU 120 parses the keyboard strokes for these keys and analyzes the keystrokes to determine the destination of the command. If the command is directed to the pod 76, no data packet is produced. If the command is directed to the workstation, a pod to pod packet is generated and transmitted. If the command is directed to the central crosspoint switch, the CPU assembles a command packet that is transmitted to the central crosspoint switch on a twisted pair cable 74*d*.

The signals from the remote computer's video port are supplied through a video cable 143 to a connector 144. As will be described below, the red, green and blue analog video signals along with the horizontal and vertical sync signals are supplied to a sync combine circuit 146 that encodes the horizontal and vertical sync signals onto the green and blue analog video signals respectively. The current mode of the monitor (i.e., the correct polarity of the horizontal and vertical sync pulses) is encoded by the sync combine circuit 146 onto the red analog video signal. The output of the sync combine is supplied to an amplifier 148 that conditions the signals and supplies the video signal to three differential line drivers 140 that transmit the signals over three separate twisted-pair cables 74*f*, 74*g*, and 74*h* to the central crosspoint switch.

The monitor sense data received from a remote workstation is decoded by the CPU 120 and supplied to a set of monitor sense leads 147. The remote computer receives the monitor sense data on these leads and adjusts its video signals for the particular monitor that is displaying the video signals.

The audio signals produced by the remote computer are supplied to a differential line driver 140 and are transmitted over a twisted-pair cable 74*c* to the central crosspoint switch.

Figure 4:
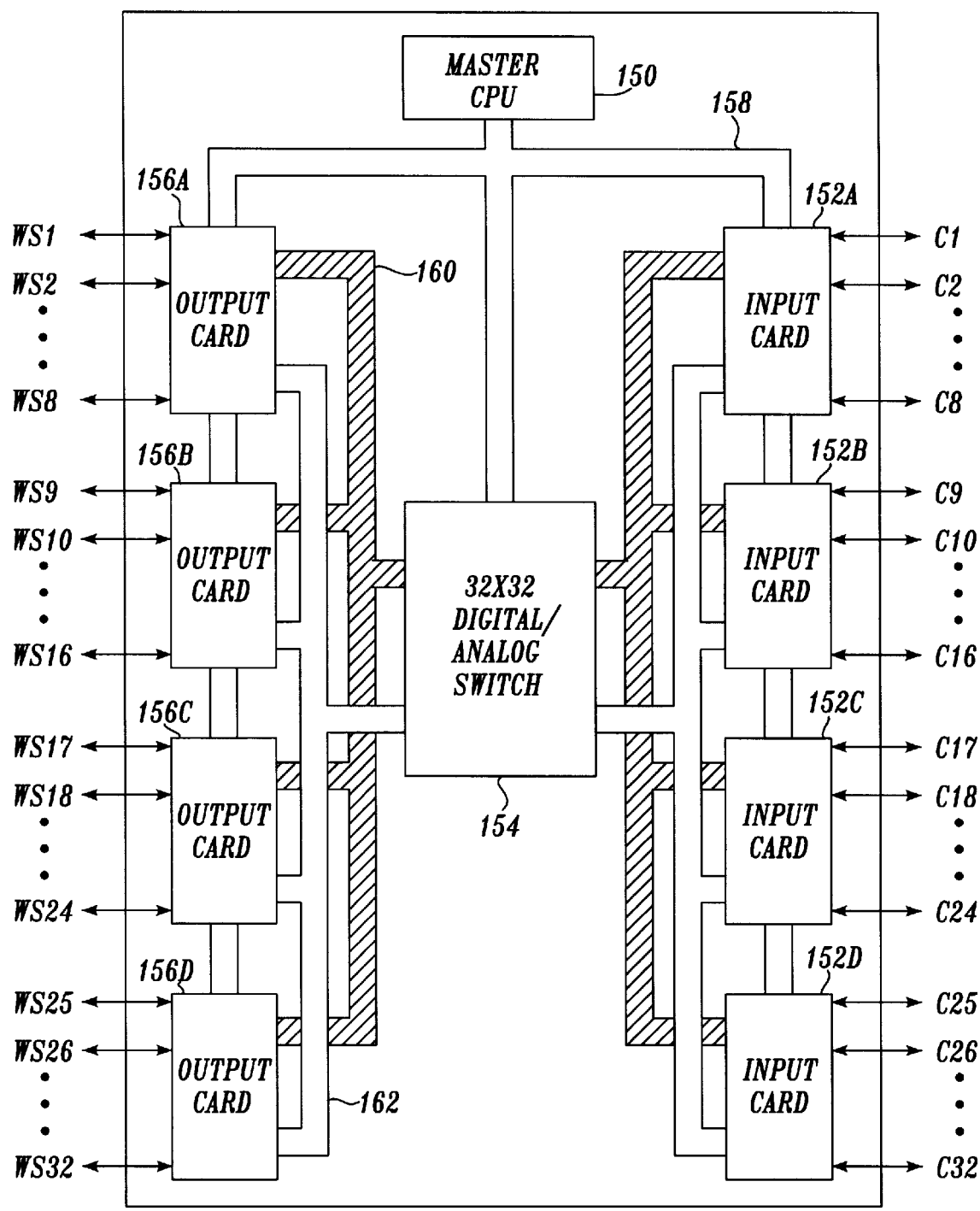
FIG. 4 is a block diagram of a crosspoint switch according to the present invention that routes data between a workstation and a remote server computer.

FIG. 4 is a block diagram of the central crosspoint switch. The central switch 60 includes a master central processing unit (CPU) 150, a number of input cards 152, a number of switch cards 154 and a number of output cards 156. Each of the input cards transmits signals to and receives signals from up to eight of the remotely located server computers while each of the output cards transmits to and receives signals from up to eight of the remotely located workstations. The master CPU 150 is coupled to each of the input cards 152, the switch cards 154 and each of the output cards 156 by a digital bus 158. Together the master CPU, input cards, switch cards and output cards are connected via a local area network.

Pod to pod packets are routed from an input card through the switch card to an output card and vice versa on a digital backplane 160. The analog video and audio signals are transmitted between the input cards, the switch card 154 and the output cards 156 on a separate analog backplane 162.

Figure 5:
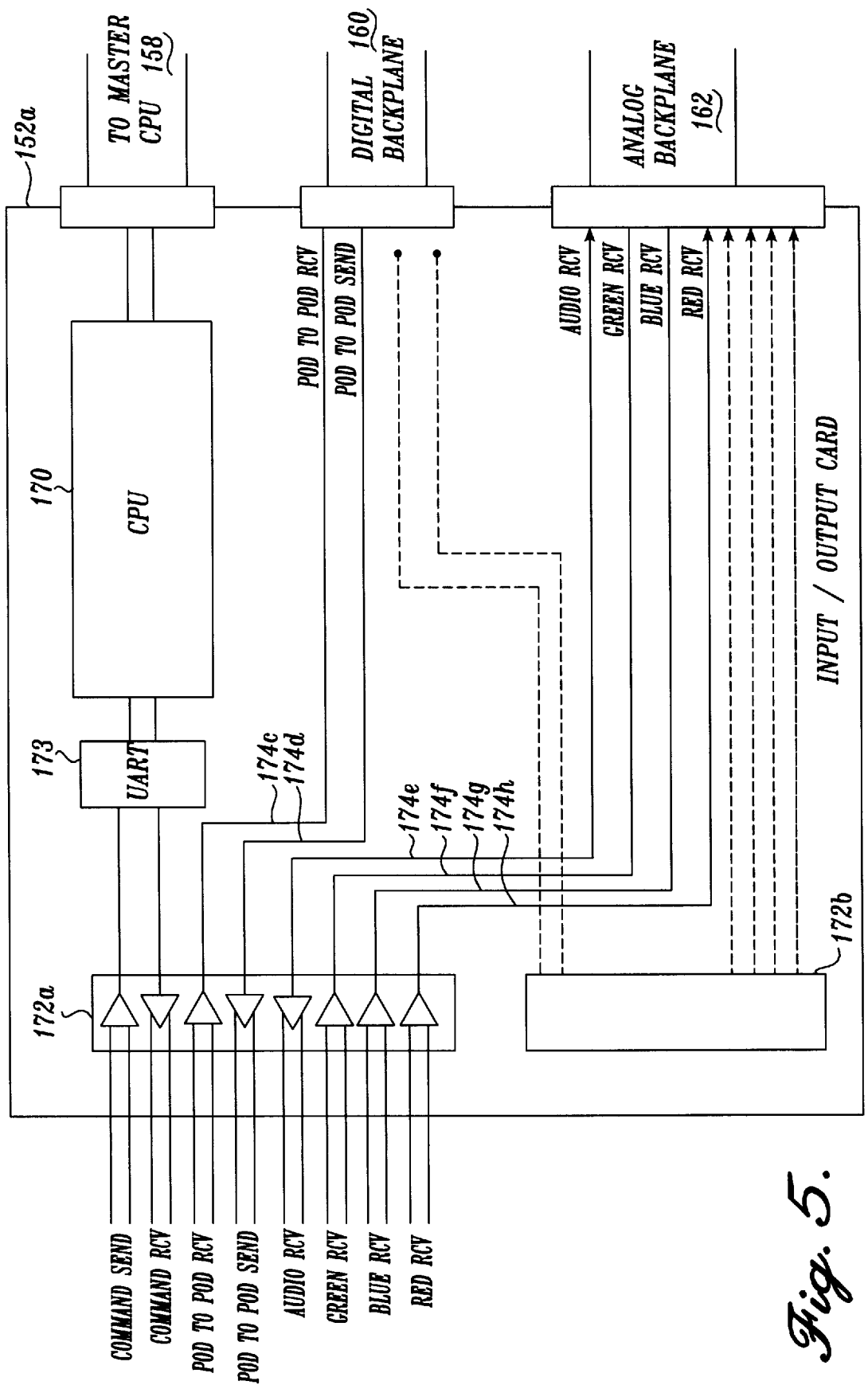
FIG. 5 is a block diagram of an input/output card that is utilized to send and receive signals at the crosspoint switch.

A block diagram of an input card 152 is shown in FIG. 5. The output cards 156 are identical to the input cards except that the direction of the audio/video signals is reversed and therefore will not be discussed separately. The input card 152 includes its own CPU 170 that transmits and receives data from the master CPU 150. Signals transmitted from the remote server computer are received by a set of differential line drivers/receivers 172*a–b*. Commands sent from the remote computer to the central crosspoint switch are received by an octal UART 173 where the commands are converted from a serial to a parallel format. The UART feeds the commands to the CPU 170 where they are interpreted and forwarded to the master CPU 150.

To transmit data between the input, output and switch cards of the crosspoint switch, the data is packetized in the format shown in FIG. 2B by the CPU of the card sending the packet. A packet begins with a unique character 112 that marks the beginning of the packet. A destination address 114 follows the start character. The address uniquely identifies one of the cards in the crosspoint switch. A byte 116 indicates the size of the packet while a byte 118 indicates the type of data included in the packet. A series of bytes 120 are the data to be transmitted from one card to another. Following the data, a byte 122 indicates the sending card's unique address.

A checksum byte 124 follows the sender's address and a unique character 126 is sent as a trailer. The transmission of all data packets between the cards of the crosspoint switch is controlled by the master CPU 150.

Returning to FIG. 5, commands generated by the CPU 170 to be transmitted to the pod that is coupled to a remote server computer are transmitted on a lead 174*b* to a differential line driver 172. Pod to pod packets received from the central computer are routed through the input card on a lead 174c to the digital backplane 160. Similarly, pod to pod packets transmitted from the remote workstation are received from the digital backplane, routed through the input card on a lead 174d and supplied to the differential line driver 172a.

In order to shield the video signals from the noise on the digital backplane, the video and audio signals transmitted from the remotely located server computer are routed on a separate analog backplane 162. The audio signals received from the remote computer are routed through the input card on a lead 174e and applied to the analog backplane 162. Video signals are received by the differential line receivers 172a and routed through the input card on leads 174f–h to the analog backplane.

In the present embodiment of the invention, each input card includes up to eight sets of differential line drivers/receivers 172a–172f (the remaining six driver/receivers not shown) to receive signals from up to eight remotely located server computers. The signals from each remotely located computer are routed through the input card to the digital and analog backplanes in the manner described above.

Figure 6:
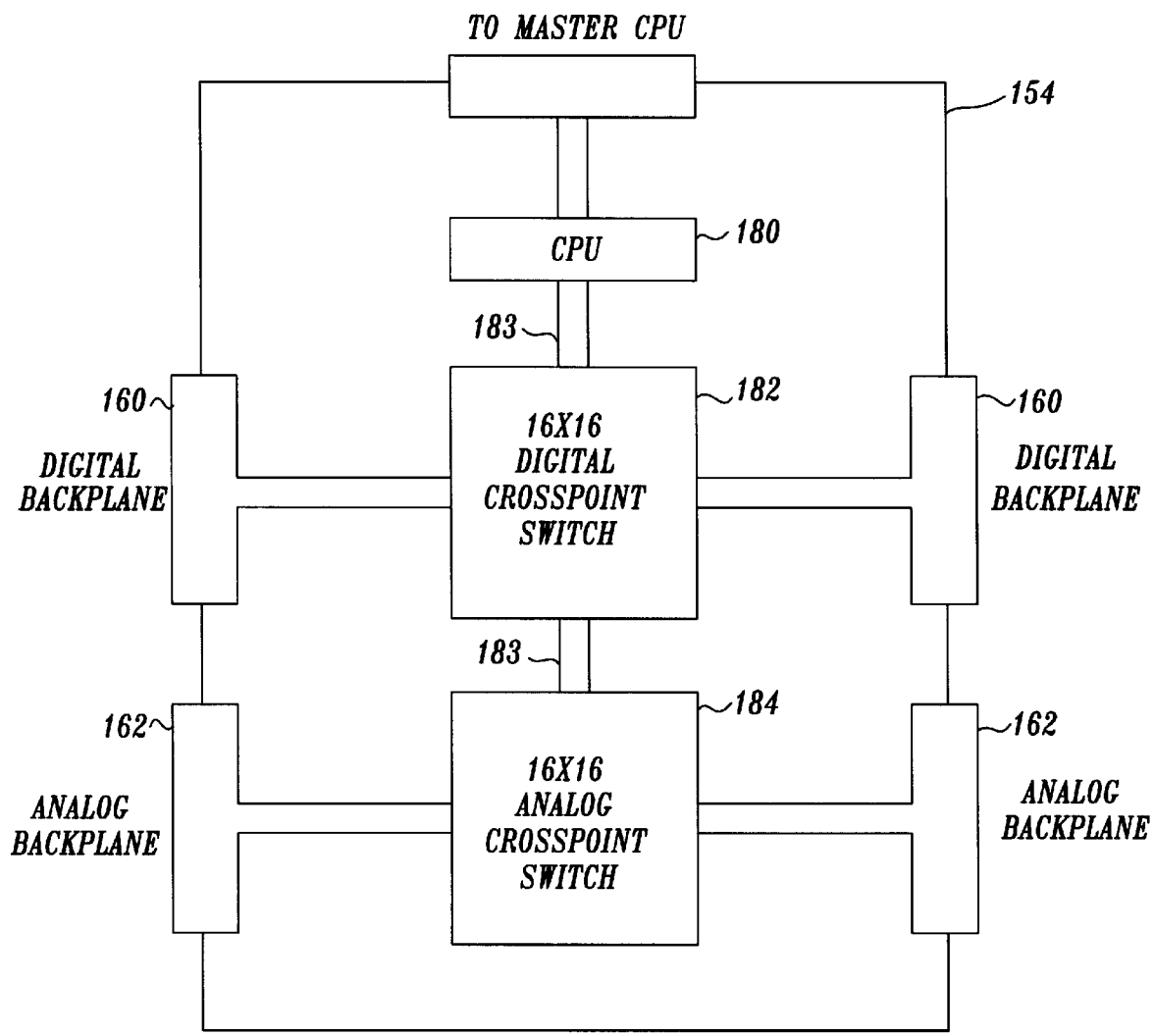
FIG. 6 is a block diagram of a switch card that routes signals through the crosspoint switch.

FIG. 6 is a block diagram of a switch card 154. The switch card includes its own central processing unit (CPU) 180. The CPU 180 transmits and receives signals from the master CPU 150 in order to control the position of a 16×16 digital crosspoint switch 182 and a 16×16 analog crosspoint switch 184 using a set of control leads 183. The digital crosspoint switch 182 connects the keyboard/mouse signals transmitted between a workstation and a remote server computer as well as audio signals generated by the remote server computer to the workstation. The analog crosspoint switch 184 transmits the video signals between a remote server computer and any of the workstations.

Figure 7:
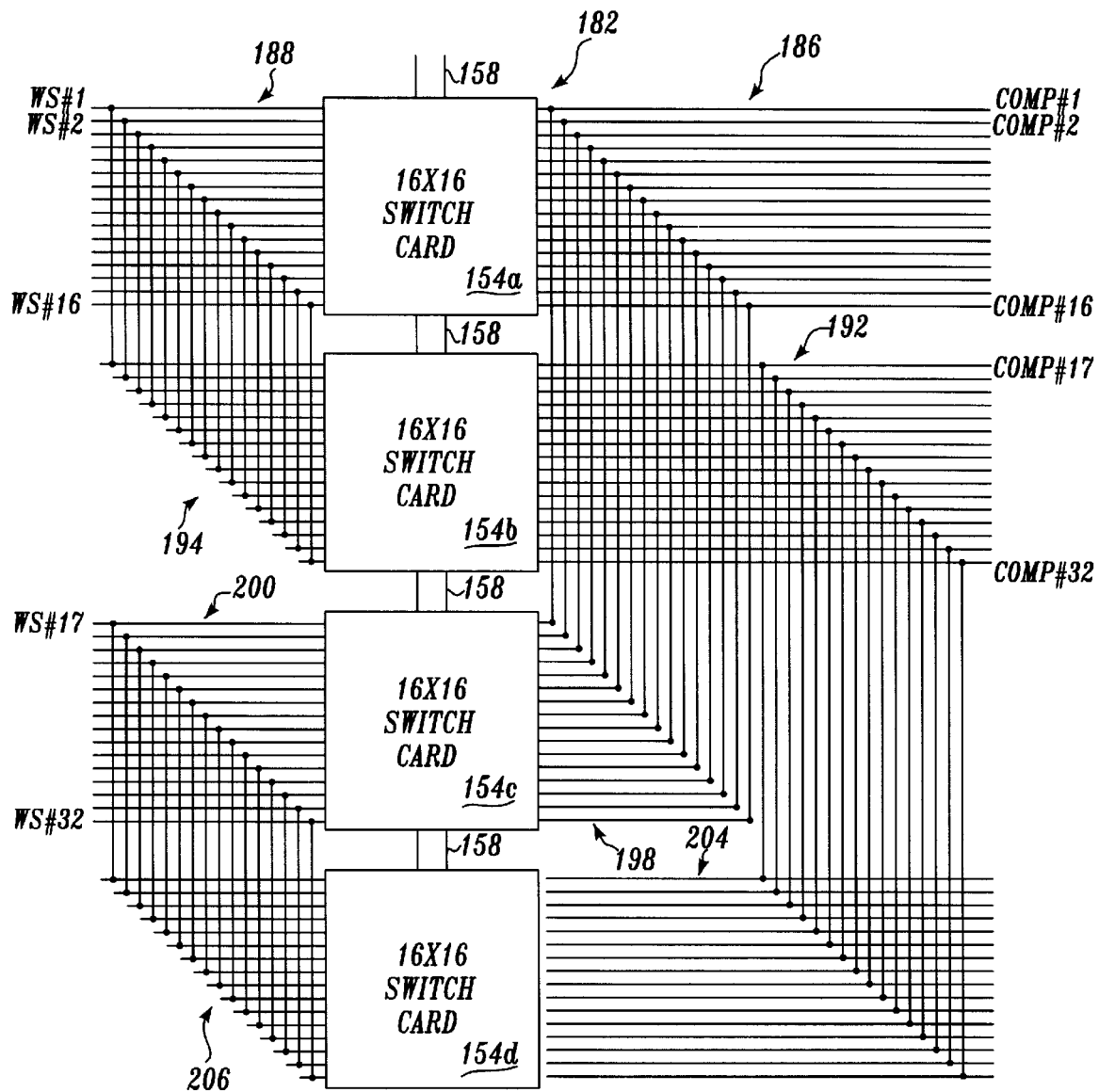
FIG. 7 is a schematic diagram showing the interconnection of four switch cards to create a 32×32 switch utilized in the crosspoint switch of the present invention.

FIG. 7 shows how the digital backplane portion of the 32×32 crosspoint switch is configured using four switch cards 154a, 154b, 154c and 154d in order to transmit signals between 32 workstations and 32 remotely located server computers. The switch card 154a has sixteen input lines 186 that are coupled to sixteen remotely located server computers and sixteen output lines 188 that are coupled to sixteen workstations. The switch card 154b has sixteen input lines coupled to another sixteen remotely located server computers and sixteen output lines 194 that are coupled to each of the sixteen output lines 188 of the switch card 154a. The switch card 154c has sixteen input lines 198 that are coupled to the sixteen input lines 186 of the switch card 154a. The sixteen output lines 200 of the switch card 154c are coupled to another sixteen remotely located workstations. The switch card 154d has sixteen input lines 204 that are coupled to each of the sixteen input lines 192 of the switch card 154b. The sixteen output lines 206 of the switch card 154d are coupled to the sixteen output lines 200 of the switch card 154c. The analog backplane is constructed in a similar fashion as the digital backplane described above. As can be seen, the arrangement of the switch cards 154a, 154b, 154c and 154d, allows data from any one of thirty-two remotely located computers to be coupled to any one of thirty-two remotely located workstations.

A switching arrangement of the type shown in FIG. 7 is required for each signal that is to be transmitted between the remotely located server computer to a corresponding workstation. In the present embodiment of the invention, each workstation sends and receives pod to pod packets as well as receives audio and video signals from the remote computer. Therefore, for the 32×32 digital switch shown in FIG. 6, the digital backplane includes two sets of switches of the type shown in FIG. 7 and the analog backplane includes another four sets of switches for the video and audio signals.

Figure 8:
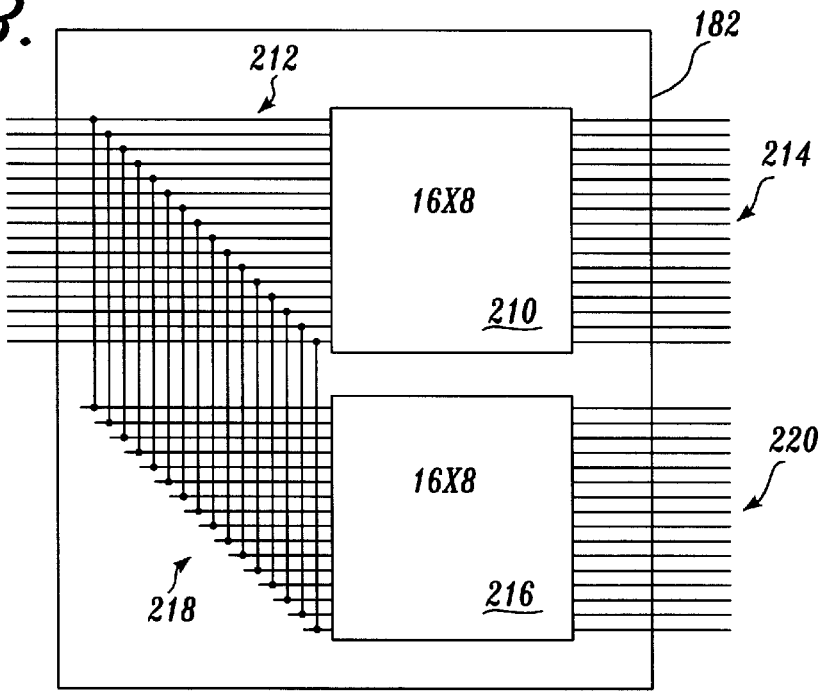
FIGS. 8 and 9 are schematic diagrams showing how a digital and analog 16×16 switch is constructed.

In the presently preferred embodiment of the invention, the digital 16×16 switches 182 are implemented using a pair of 16×8 digital switches as shown in FIG. 8. Each 16×16 switch comprises switches 210 and 216. The switch 210 has sixteen input lines 212 and eight output lines 214. The switch 216 has sixteen input lines 218 that are coupled to each of the input lines 212, and eight output lines 220. In the presently preferred embodiment of the invention, each of the 16×8 switches 210 and 216 are part numbers CD22M34945Q, manufactured by Harris.

Figure 9:
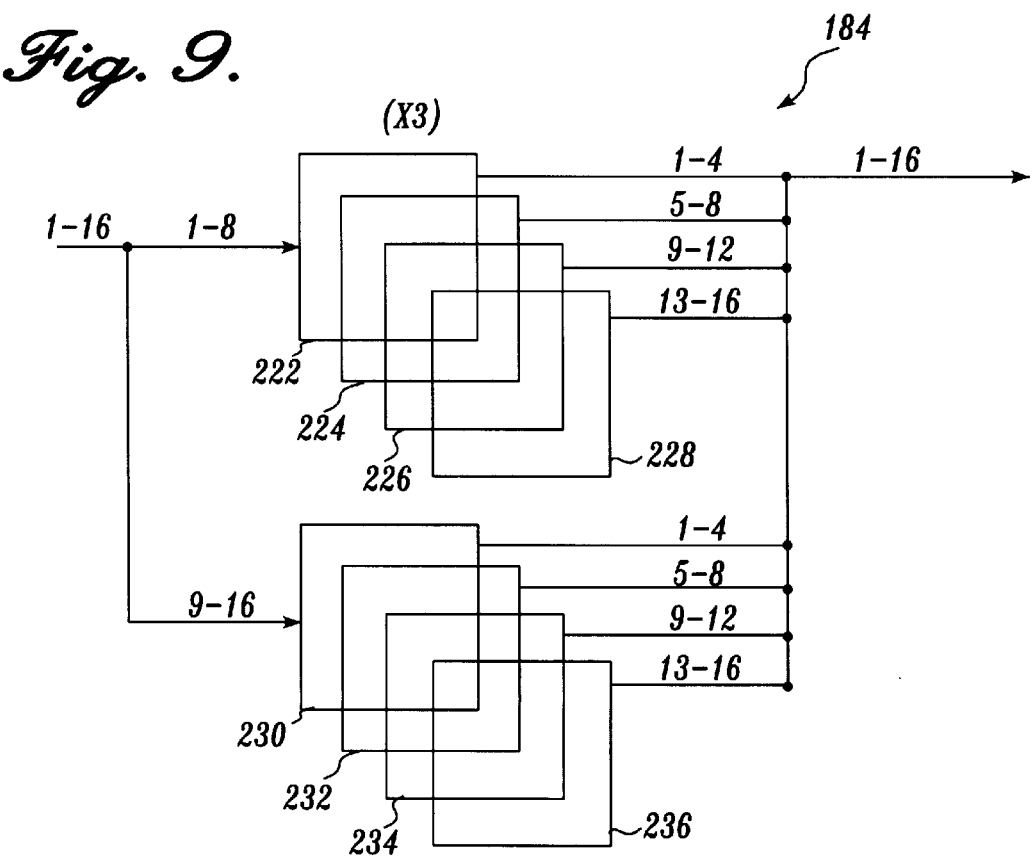

The analog backplane on which the video signals are transmitted is configured in the same fashion as the switch shown in FIG. 7. However, because of the greater bandwidth required, each 16×16 switch 184 is implemented using eight 8×4 analog switches model no. DG884DN, manufactured by Siliconix. As can be seen in FIG. 9, a 16×16 analog switch is implemented using switches 222, 224, 226 and 228 each having eight input lines and four output lines. The input lines of switches 222, 224, 226 and 228 are connected in parallel. A second set of switches 230, 232, 234 and 236, each having eight input lines and four output lines. The input lines of switches 230, 232, 234 and 236 are connected in parallel. The outputs of switch 230 are coupled in parallel with the outputs of switch 222, and the outputs of switch 232 are coupled in parallel with the outputs of switch 224. The outputs of switch 234 are coupled in parallel with the outputs of switch 226 and the outputs of switch 236 are coupled in parallel with the outputs of switch 228.

To minimize the number of wires that must extend from the remote computer to the workstation, the present invention encodes the horizontal and vertical sync signals onto the analog color video signals transmitted from the remote computer.

Figure 10A:
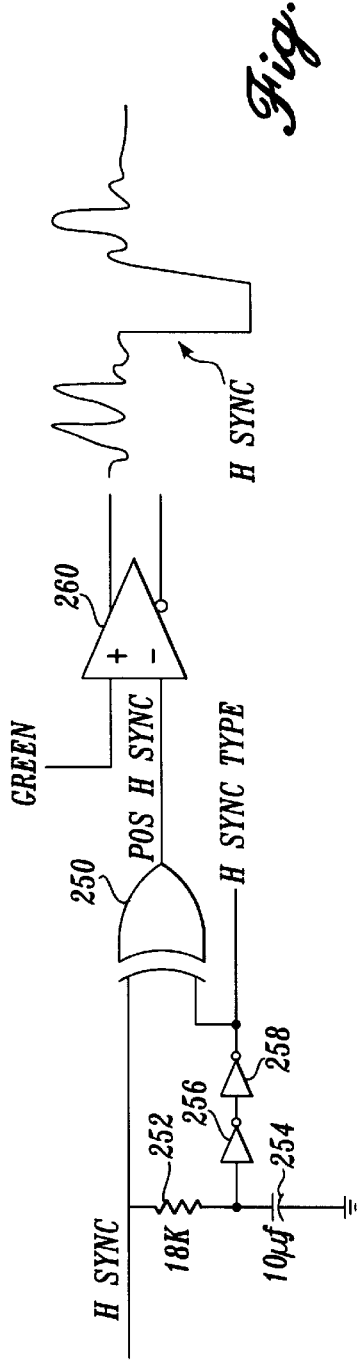
FIGS. 10A–10C are schematic diagrams of circuits for encoding horizontal sync, vertical sync and video mode signals onto an analog video signal according to another aspect of the present invention.
Figure 10B:
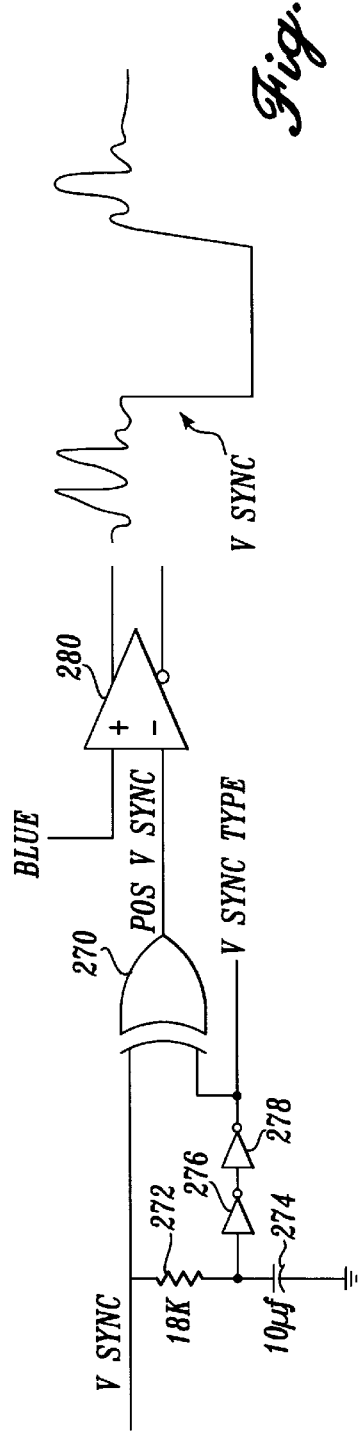
Figure 10C:
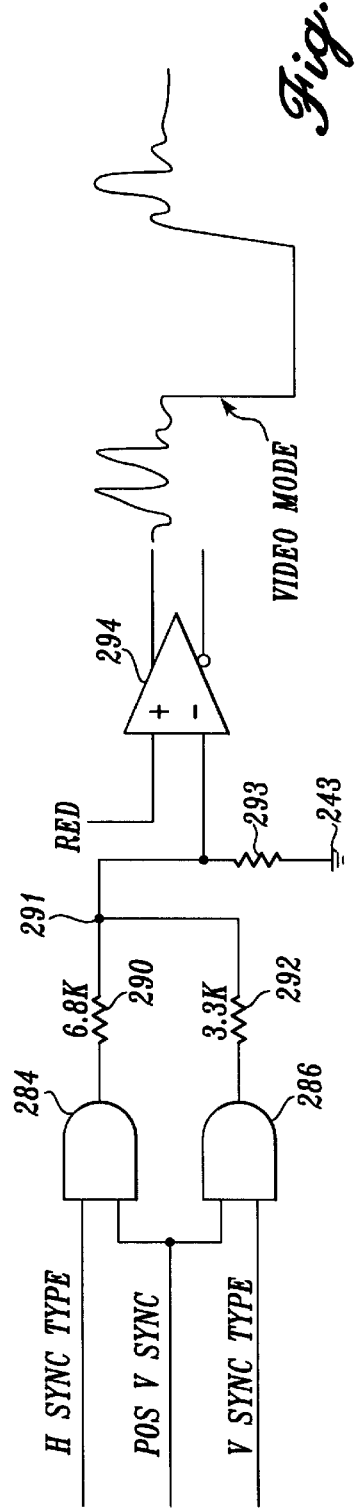

FIGS. 10A–10C show the details of the sync combine circuit 146 (FIG. 3) that encodes the vertical and horizontal sync signals as well as the mode signal of the monitor. FIG. 10A shows a circuit that encodes the horizontal sync signal onto the green video signal produced by a remote computer. The circuit includes an exclusive or XOR) gate 250 having a first input that receives the horizontal sync signal produced by the computer system. A resistor 252 and capacitor 254 are connected in a series between the first input of the XOR gate and ground. At the junction of the resistor 252 and the capacitor 254 are two series connected inverting gates 256 and 258. The output of the inverter 258 is supplied to a second input of the XOR gate 250.

The XOR gate 250 operates to encode the horizontal signal as a positively going pulse no matter what the normal state of the horizontal sync signal is. The voltage on the capacitor 254 is equal to the average valve of the horizontal sync signal The output of the inverting gate 258 has a logic level equal to the non-active state of the horizontal sync signal. The output of the XOR gate 250 is coupled to an inverting input of an amplifier circuit 260. The non-inverting input of the amplifier 260 is connected to receive the green analog video signal. When the horizontal sync signal is in its normal state, the output of the amplifier 260 follows the green analog video signal. However, when the horizontal sync signal is activated, the active video is at zero volts and the amplifier 260 produces a negative going horizontal sync pulse.

FIG. 10B shows a circuit that encodes the vertical sync signal onto the blue analog video signal produced by the remote computer. The circuit comprises an exclusive or (XOR) gate 270, a resistor 272, capacitor 274 and a pair of inverters 276, 278 that are connected in the same way as the horizontal sync circuit shown in FIG. 10A and described above. The output of the XOR gate is always a positive going pulse when the vertical sync signal is activated. The output of the XOR gate is fed to the inverting input of an amplifier 280. When the vertical signal is in its normal state, the output of the amplifier 280 follows the blue analog video signal. However, when the vertical sync signal is activated, a negative going pulse, V-sync, is created by the amplifier.

FIG. 10C is an electronic circuit that encodes the mode of the video monitor. The mode refers to the polarity of the horizontal and vertical sync signals. Changes in the mode affect the size of the video display produced by a video monitor. To encode the mode of the video signal, the circuit shown in FIG. 10C is used. The circuit comprises two AND gates 284 and 286. The AND gate 284 has one input coupled to the output of the inverter 258 (shown in FIG. 10A). The AND gate 286 has one input coupled to the output of the inverter 278 (shown in FIG. 10B). The remaining inputs of the AND gates 284 and 286 are coupled to the output of the XOR gate 270 (shown in FIG. 10B) so that the mode signal is only encoded onto the red video signal when the vertical sync signal is activated.

The output of the AND gates 284 and 286 are coupled in series with a pair of resistors 290 and 292, respectively. The resistors 290 and 292 are coupled together at a common node 291. Connected between the node 291 and ground is a resistor 293. Each time the vertical sync signal is active, the AND gates 284 and 286 produce a voltage at the node 291 that is proportional to the mode of the video monitor. The proportional voltage is fed into the inverting input of an amplifier 294. The non-inverting input of the amplifier 294 is connected to receive the red analog video signal produced by the remote computer. When the vertical sync signal is in its normal state, the output signal of the comparator 294 follows the red analog video signal. However, when the vertical synchronize signal is activated, the mode signal is encoded on the red video signal.

Figure 11A:
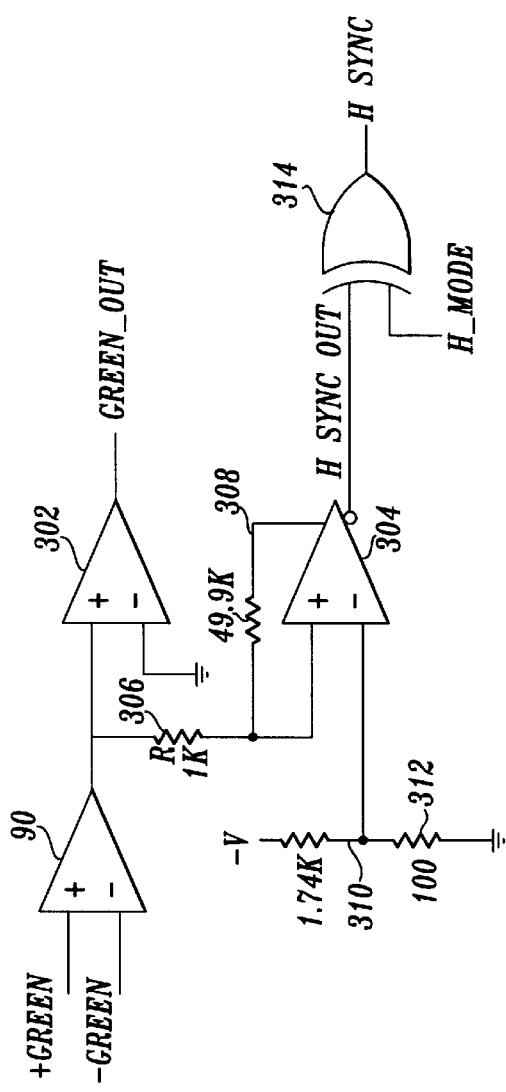
FIGS. 11A and 11B are schematic diagrams of circuits for extracting the encoded horizontal and vertical sync signals and the mode signal from an analog video signal.

After the video signals have been transmitted from the remote server computer and through the analog crosspoint switch to the remote workstation, the sync signals are extracted from the green and blue video signals. To extract the horizontal sync signal from the green video signal, the circuit shown in FIG. 11A is used. The green video signal is received by the pod at a differential receiver 90 that produces an output signal which is fed to a non-inverting input of a clipping amplifier 302. The output signal of the amplifier 302 is the green analog video signal that is fed to the video monitor. A resistor 306 is disposed between a non-inverting input of a comparator 304 to the output of the differential receiver 90. Connected between a non-inverting output of the comparator 304 and the non-inverting input is a feedback resistor 308. An inverting input of comparator 304 is tied to a constant reference voltage that is supplied by the voltage divider defined by resistors 310 and 312. When the output signal of the differential receiver 90 has a magnitude below the voltage provided at the inverting input of the comparator 304, the inverting output of amplifier 304 creates a positive going pulse. The positive going pulse is supplied to an input of an exclusive or (XOR) gate 314. Coupled to another input of the exclusive or gate 314 is the horizontal mode (H-mode) signal which is recovered from the red analog video signal as will be described below. The XOR gate 314 adjusts the polarity of the horizontal sync signal depending on the value of the H-mode signal.

The circuit required to extract the vertical sync signal from the blue video signal is the same as the circuit shown in FIG. 11A except that the exclusive or (XOR) gate receives the V-mode signal in order to adjust the polarity of the vertical sync signal.

Figure 11B:
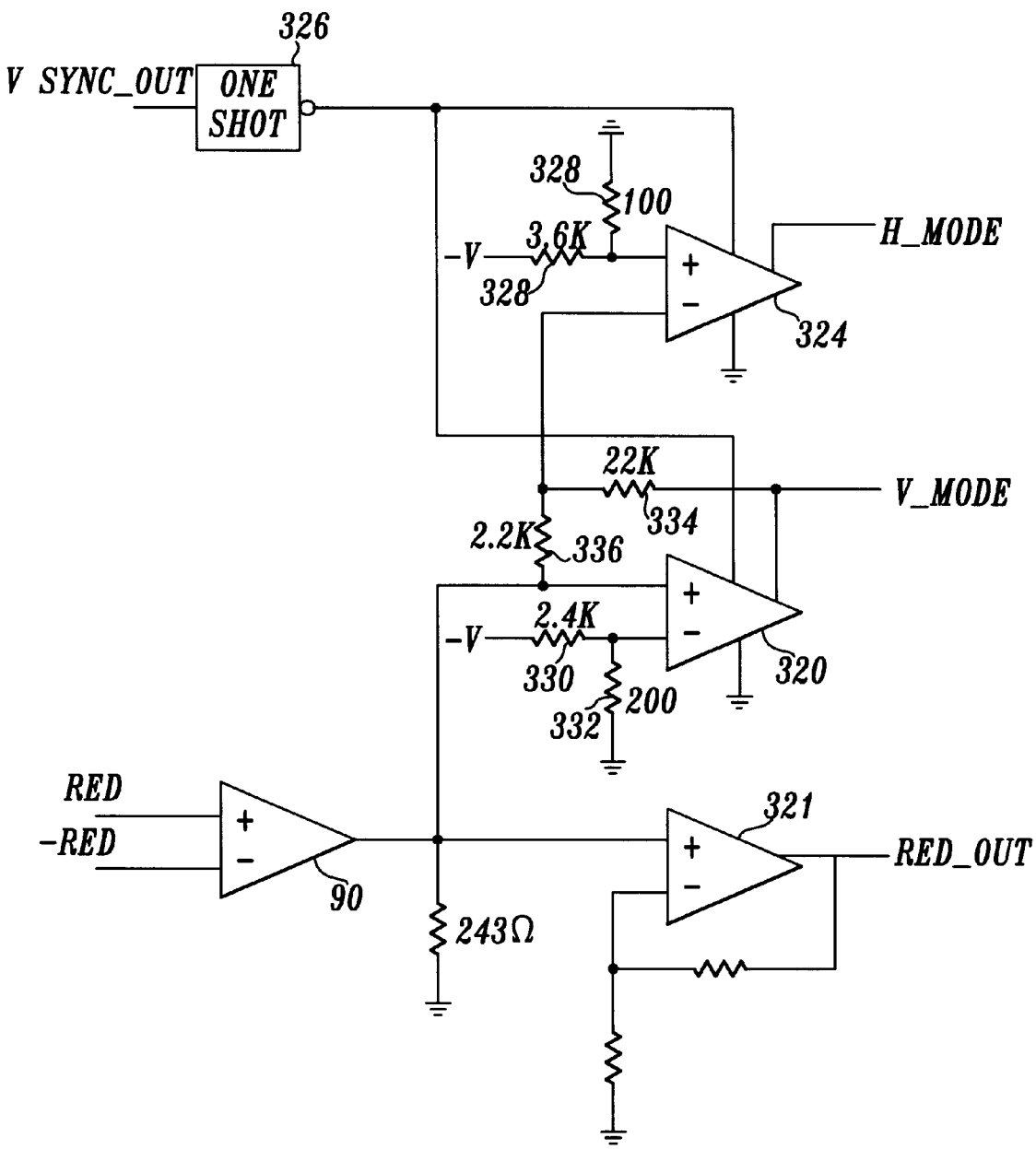

To recover the video mode signal, the present invention utilizes the circuit shown in FIG. 11B. The red analog video signal is received at a pod by a differential line receiver 90 that produces the red analog video signal. The output of the differential line receiver 90 is coupled to the inverting inputs of a pair of comparators 320 and 324. The comparators 324 are gated by the output of a one shot 326 that is triggered by the rising edge of the vertical sync pulse so that the comparators only change state when the vertical sync signal is active. The noninverting input of comparator 324 is supplied with a reference voltage produced by a voltage divider that comprises a resistor 326 and a resistor 328. The inverting input of the comparator 320 is supplied with a constant voltage produced by a voltage divider that comprises a resistor 330 and a resistor 332.

A resistor 334 is placed between the output of comparator 320 and the inverting input of comparator 324. Finally, a resistor 336 is placed between the inverting input of comparator 320 and the inverting input of comparator 324.

The mode extract circuit produces two signals, H-mode and V-mode, having logic levels that are dependent on the magnitude of the mode signal encoded on the red video signal. If the magnitude of the mode signal is between 0 and −0.15 volts, the H-mode signal will be low and the V-mode signal will be low. When the mode signal has a magnitude between −0.15 and −0.29 volts, the H-mode signal will be high and the V-mode signal will remain low. The V-mode signal is high and the H-mode signal is low when the magnitude of the mode signal is between −0.29 volts and −0.49 volts. Both the H-mode and V-mode signals are high when the magnitude of the mode signal is less than −0.49 volts. As will be appreciated, the values given above will differ if different circuit components are used.

Once the video mode signal has been decoded from the red video signal, the values of H-mode and V-mode are used to adjust the polarity of the horizontal and vertical sync signals using the XOR gate shown in FIG. 11A.

As can be seen, the circuits shown in FIGS. 10A–10C and 11A, 11B reduce the number of wires that must extend between the remote server computer and the workstation by encoding the sync and mode signals onto the color video signals at a time when the signals are normally unused.

Having now described the components of the present invention, its operation is described. To connect a workstation to a remote computer, a user sends a command that causes the central crosspoint switch to couple the keyboard/mouse signals to one of the remote computers. As indicated above, commands that affect the operation of the crosspoint switch as inserted between "printscreen" and "enter" keystrokes. The pod connected to the workstation detects these keys and transmits a packet to the CPU on one of the output cards. The CPU then transmits the packet to the master CPU that validates the request and issues a command to the switch cards to set the position of the 16×16 digital and analog switches 182 and 184 (FIG. 6). Once the position of the switches has been set, the master CPU tells the computer pod 76 that the connection has occurred. The keyboard/mouse signals are then packetized and transmitted as pod to pod packets through the crosspoint switch. Video and audio signals from the remote computer are transmitted from the remote computer to the workstation.

Figure 12B:
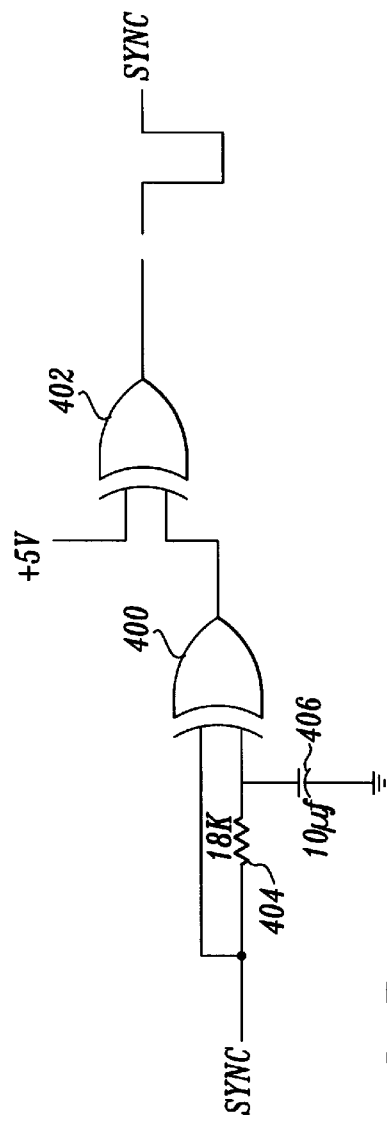
FIG. 12B is a circuit diagram of a circuit that inverts the polarity of horizontal and vertical sync signals that is used within the onscreen programming circuit of FIG. 12A
Figure 12A:
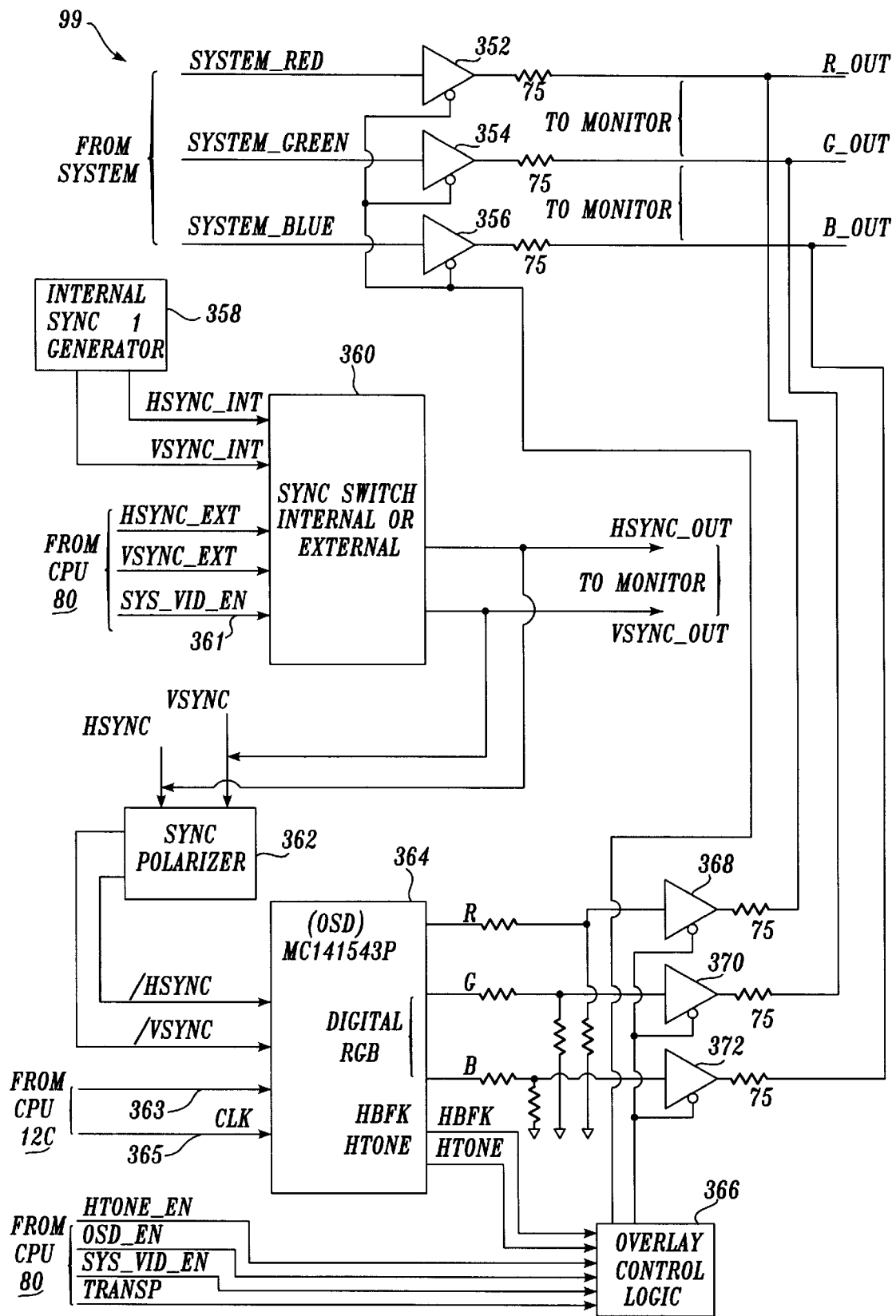
FIG. 12A is a circuit diagram of an onscreen programming circuit that produces video displays on the workstation's monitor according to yet another aspect of the present invention.

As indicated above, the present invention provides the capability of allowing a user to send commands from a workstation to the central crosspoint switch in response to prompts that are displayed on the video monitor. The onscreen programming circuit 99 shown in FIG. 2 produces video signals that displays a menu of commands to be selected by the user. FIG. 12A is a circuit diagram of the onscreen programming circuit 99. The circuit includes a set of tri-state buffers 352, 354 and 356 that have their inputs connected to the red, green and blue video signals provided by the sync extract circuit 94 (shown in FIG. 2). When the tri-state buffers are energized, the red, green and blue video signals are passed to the video monitor. When the tri-state buffers 352, 354 and 356 are in their high impedance state, the video signals are produced by an onscreen programming circuit 364, as will be described.

The onscreen programming circuit 99 produces its own horizontal and vertical sync signals using a sync generator 358. The horizontal and vertical sync signals produced are supplied to a switch 360 that selects either the sync signals produced by the internal sync generator 358 or the external, horizontal and vertical sync signals recovered from the green and blue video signals transmitted from the remote computer. The switch 360 receives a signal on a lead 361 that is coupled to the CPU 80 (FIG. 2) that determines which set of horizontal and vertical sync signals are selected. The horizontal and vertical sync signals selected by the switch 360 are fed to the video monitor at the user's workstation. Also connected to the output of the switch 360 is a sync polarizer 362 that forces the polarity of the horizontal and vertical sync signals selected to be active low. The details of the sync polarizer 362 are shown in FIG. 12B.

The sync polarizer includes a pair of exclusive OR (XOR) gates 400 and 402. The XOR gate 400 has one input connected directly to the sync signal to be polarized. A resistor 404 is connected between the sync signal and the other input of the XOR gate 400. Connected between the second input of the XOR gate 400 and ground is a capacitor 406. The voltage on the capacitor 406 is the average voltage of the sync signals. The output of the XOR gate 400 feeds an input of the XOR gate 402. The other input of the XOR gate 402 is coupled to a logic high signal. The output of the XOR gate 402 will be a negative going pulse each time the sync signal is activated no matter what the normal state of the sync signal is.

The outputs of the sync polarizer 362 are coupled to a horizontal and vertical sync input of an onscreen processor 364. The onscreen processor produces red, green and blue video signals that display one or more alphanumeric characters that are programmed in its internal video ROM memory. To dictate which characters are placed on the video screen, the CPU 80 generates serial I$^2$C interface signals on a pair of leads 363 and 365. These signals are applied to the onscreen processor 364 which causes the processor to retrieve from an internal video RAM characters that are to be displayed on the video screen. The onscreen processor 364 provides two signals HBFK and HTONE that are supplied to an overlay control logic circuit 366. Also supplied to the overlay control logic circuit are four signals from the CPU 80 of the user pod. These four signals are H Tone Enable, OSD Enable, System Video Enable and Transparent. The overlay control logic circuit 366 reads the value of these logic signals and either enables or disables a set of tri-state buffers 368, 370 and 372 on the tri-state buffers 352, 354 and 356. These tri-state buffers 368, 370 and 372 couple the outputs of the onscreen processor 364 to the leads that connect to the monitor's color inputs.

When the tri-state buffers 352, 354 and 356 are in their high impedance state, and the tri-state buffers 368, 370 and 372 are active, then the video screen will only display those signals produced by the onscreen processor. Conversely, if the tri-state buffers 368, 370 and 372 are in their high impedance state and the tri-state buffers 352, 354 and 356 are active then the monitor displays the video signals produced by the remote computer system. If both sets of tri-state buffers 368, 370, 372 and 352, 354 and 356 are both active, then the monitor will display the video signals produced by both the onscreen processor and the remote computer system. The following is a table that defines the logic of the overlay control logic circuit 366.

| HTONE | HBFK | H TONE ENABLE | OSD ENABLE | SYS_VID_EN | TRANS-PARENT | DISPLAY |
|---|---|---|---|---|---|---|
| X | 0 | X | 0 | 0 | X | screen blank |
| X | X | X | 0 | 1 | X | system video displayed only |
| X | 1 | 0 | 1 | 0 | 0 | OSD displayed only |
| 1 | 1 | 1 | 1 | 0 | 0 | OSD with transparent characters, i.e., characters transparent, OSD windows solid |
| X | X | X | 1 | 0 | 1 | illegal state |
| 0 | 1 | 0 | 1 | 1 | 0 | active system video with solid OSD characters |
| 1 | 1 | 1 | 1 | 1 | 0 | active system video transparent OSD characters and solid OSD windows |
| 1 | 1 | 0 | 1 | 1 | 1 | active system video with opaque OSD characters and windows |

-continued

| HTONE | HBFK | H TONE ENABLE | OSD ENABLE | SYS_VID_EN | TRANS-PARENT | DISPLAY |
|---|---|---|---|---|---|---|
| 1 | 1 | 1 | 1 | 1 | 1 | active system video transparemt OSD characters and opaque OSD windows |

The construction of the overlay control logic circuit 366 given the above table is considered to be within the skill of an ordinary digital electronics engineer.

To activate the onscreen programming display, the user begins the escape sequence by pressing the "printscreen" key. The CPU within the user pod recognizes this key and produces a menu on the video screen. The user then selects one or more items from the menu by typing on the keyboard or moving the mouse. The CPU then interprets these mouse/keyboard inputs as commands that are to be transmitted to the central crosspoint switch. Once the user ends a command by activating the "enter" key, the CPU can generate one or more packets that are transmitted to the central crosspoint switch that enable the user to connect to a different computer, monitor the status of a different computer, etc.

As can be seen, the present invention allows a user to access any of thirty-two remotely located computers from a central workstation. The system operates apart from a network so that if the network fails, a user can still access each of the server computers. Furthermore, the pods act as translators between different keyboard/monitor types and different computers. Because all pod to pod packets have the same format, previously incompatible equipment can be easily coupled together.

While the preferred embodiment of the invention has been illustrated and described, it will be appreciated that various changes can be made therein without departing from the spirit and scope of the invention. For example, although the present invention is described with respect to connecting workstations to remotely located computers for the purposes of system administration, it will be appreciated that the invention also has further uses. For example, it may be desirable to locate expensive computer equipment away from relatively inexpensive terminals. Therefore, the present invention could be used in academic sessions where it is desirable to allow students to operate remotely located computers from one or more workstations. It is believed that the present invention has numerous applications where it is desirable to separate computing equipment from computer display and data input devices. Therefore, the scope of the invention is to be determined solely from the following claims.

The embodiments of the invention in which an exclusive property or privilege is claimed are defined as follows:

1. A system for connecting a number of workstations of the type that include a keyboard, mouse and video monitor to a number of remote computer systems, comprising:

a plurality of first signal conditioning units coupled to the workstations for receiving electronic signals produced by the keyboard and mouse and for creating a serial data packet that includes the electronic signals;

a plurality of first communication links coupled to the first signal conditioning units for carrying the serial data packets;

a central crosspoint switch including a number of bidirectional inputs and outputs, said central crosspoint switch receiving the serial data packets from an input and routing the serial data packet to one or more of said outputs;

a plurality of second communication links coupled to the outputs of the central crosspoint switch; and a plurality of second signal conditioning units coupled to the remote computer systems, for receiving the serial data packets transmitted on one of the plurality of second communication links switch and for supplying the data packets to a keyboard and mouse input of the remote computer, the plurality of second signal conditioning units receiving video signals produced by the remote computer systems and transmitting the video signals to the central switch on one of the plurality of second communication links, wherein the video signals include a red, green and blue video signal as well as a horizontal and vertical sync signal, and wherein each of the second signal conditioning units includes an encoder circuit that encodes the horizontal and vertical sync signal onto the two of the red, green or blue video signals before the video signals are transmitted to the central switch.

2. The system of claim 1, wherein the video signals include a mode signal that indicates a polarity of the horizontal and vertical sync signal, and wherein the encoder circuit encodes the mode signal onto one of the red, green or blue video signals before the video signals are transmitted to the central switch.

3. The system of claim 1, wherein the first signal conditioning units include a decoder circuit for removing the horizontal and vertical sync signals from the red, green or blue video signals.

4. The system of claim 3, wherein the decoder circuit removes the mode signal from the red, green or blue video signals.

5. The system of claim 4, wherein the decoder circuit includes a circuit for adjusting the polarity for the horizontal and vertical sync signals based on the decoded mode signal.

6. The system of claim 5 further comprising an onscreen programming circuit that is included in the first signal conditioning unit, the onscreen programming circuit producing video signals that are displayed by the video monitor.

* * * * *

UNITED STATES PATENT AND TRADEMARK OFFICE
CERTIFICATE OF CORRECTION

PATENT NO. : 5,937,176  Page 1 of 3
DATED : August 10, 1999
INVENTOR(S) : D.L. Beasley et al.

It is certified that error appears in the above-identified patent and that said Letters Patent is hereby corrected as shown below:

| COLUMN | LINE | | | |
|---|---|---|---|---|
| [56]<br>Pg. 2, col. 2 | Refs. Cited<br>(U.S. Patents) | \multicolumn{3}{l}{insert the following in appropriate numerical order among the U.S. Patents:} | |
| | | --4,479,122 | 10/1984 | Redman et al. |
| | | 4,550,386 | 10/1985 | Hirosawa et al. |
| | | 4,768,083 | 8/1988 | Romesburg |
| | | 4,939,507 | 7/1990 | Beard et al. |
| | | 4,949,248 | 8/1990 | Caro |
| | | 4,953,159 | 8/1990 | Hayden et al. |
| | | 5,036,484 | 7/1991 | McCoy et al. |
| | | 5,051,720 | 9/1991 | Kittirutsunetorn |
| | | 5,214,785 | 5/1993 | Fairweather |
| | | 5,220,380 | 6/1993 | Hirata et al. |
| | | 5,247,615 | 9/1993 | Mori et al. |
| | | 5,260,778 | 11/1993 | Kauffman et al. |
| | | 5,261,079 | 11/1993 | Celi, Jr. |
| | | 5,280,583 | 1/1994 | Nakayama et al. |
| | | 5,283,639 | 2/1994 | Esch et al. |
| | | 5,287,461 | 2/1994 | Moore |
| | | 5,327,156 | 7/1994 | Masukane et al. |
| | | 5,347,646 | 9/1994 | Hirosawa et al. |

UNITED STATES PATENT AND TRADEMARK OFFICE
CERTIFICATE OF CORRECTION

PATENT NO. : 5,937,176
DATED : August 10, 1999
INVENTOR(S) : D.L. Beasley et al.

It is certified that error appears in the above-identified patent and that said Letters Patent is hereby corrected as shown below:

| COLUMN | LINE | | | |
|---|---|---|---|---|
| *(Continued)* | | 5,349,675 | 9/1994 | Fitzgerald et al. |
| | | 5,392,400 | 2/1995 | Berkowitz et al. |
| | | 5,440,618 | 8/1995 | Riegel et al. |
| | | 5,537,548 | 7/1996 | Fin et al. |
| | | 5,577,210 | 11/1996 | Abdous et al. |
| | | 5,579,087 | 11/1996 | Salgado |
| | | 5,583,993 | 12/1996 | Foster et al. |
| | | 5,603,060 | 2/1997 | Weinberger et al. |
| | | 5,606,604 | 2/1997 | Rosenblatt et al. |
| | | 5,608,872 | 3/1997 | Schwartz et al. |
| | | 5,674,003 | 10/1997 | Anderson et al. |
| | | 5,689,671 | 11/1997 | Strömberg |
| | | 5,701,161 | 12/1997 | Williams et al. |
| | | 5,708,961 | 1/1998 | Hylton et al. |
| | | 5,719,622 | 2/1998 | Conway-- |

[56] Refs. Cited  after the last Foreign Reference, insert
Pg. 1, col. 2 (Foreign Patents,  --G 93 03 716.3  11/1993  Germany--
after Item 4)

UNITED STATES PATENT AND TRADEMARK OFFICE
CERTIFICATE OF CORRECTION

PATENT NO. : 5,937,176
DATED : August 10, 1999
INVENTOR(S) : D.L. Beasley et al.

It is certified that error appears in the above-identified patent and that said Letters Patent is hereby corrected as shown below:

| COLUMN | LINE | |
|---|---|---|
| [56] Pg. 2, col. 2 | Refs. Cited (Other Refs., after Item 7) | after the last Other Publication, insert --General Instrument 2750R Satellite Receiver User's Guide 2700 Series, Publication No. 72089-1, Rev. C, April 1990.-- |

Signed and Sealed this

Eighth Day of August, 2000

Attest:

Q. TODD DICKINSON

*Attesting Officer*    *Director of Patents and Trademarks*

UNITED STATES PATENT AND TRADEMARK OFFICE
CERTIFICATE OF CORRECTION

PATENT NO.    : 5,937,176   Page 1 of 1
DATED         : August 10, 1999
INVENTOR(S)   : Danny L. Beasley et al.

It is certified that error appears in the above-identified patent and that said Letters Patent is hereby corrected as shown below:

<u>Column 8,</u>
Line 12, change "CD22M34945Q" to -- CD22M3494SQ --.

Signed and Sealed this

Nineteenth Day of November, 2002

Attest:

Attesting Officer

JAMES E. ROGAN
*Director of the United States Patent and Trademark Office*